June 7, 1966  H. M. PURCELL  3,255,336
WELDING MACHINE

Filed Feb. 7, 1963  3 Sheets-Sheet 1

INVENTOR.
HOWARD M. PURCELL

INVENTOR.
HOWARD M. PURCELL

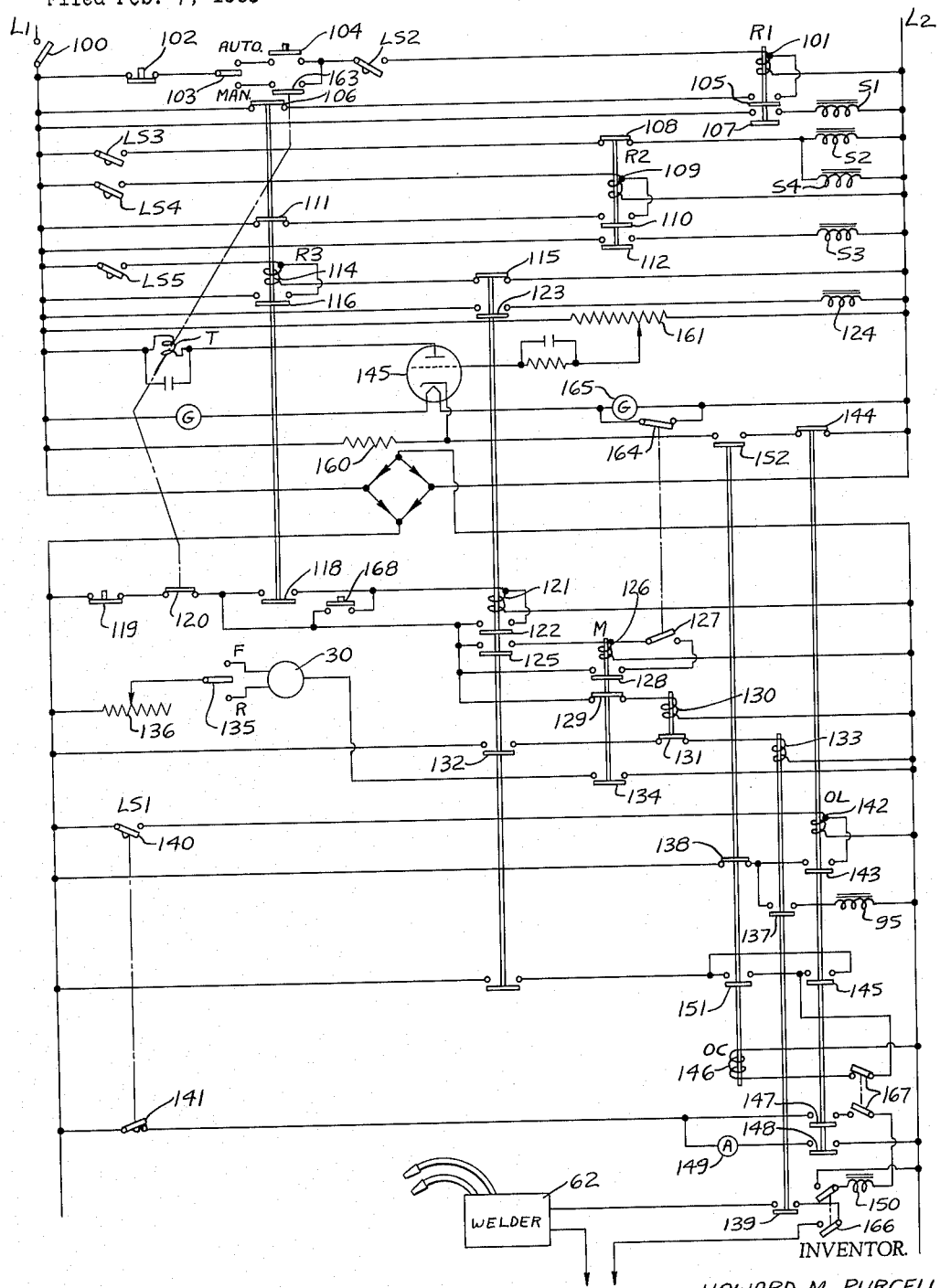

United States Patent Office 3,255,336
Patented June 7, 1966

3,255,336
WELDING MACHINE
Howard M. Purcell, Cleveland, Ohio, assignor to Hydyn Company, Chardon, Ohio, a corporation of Ohio
Filed Feb. 7, 1963, Ser. No. 257,024
12 Claims. (Cl. 219—124)

This invention relates to an apparatus for welding and is particularly concerned with an apparatus of this nature for automatically welding cylindrical members together.

In the art of welding, there are many instances wherein it is desired to form an annular weld bead. This might arise, for example, in connection with putting heads on a cylinder or for connecting a wrench socket to a tubular shank or the like. Still other instances where circular or annular beads of welding material are to be laid down will occur to those skilled in the art. It is in particular connection with an automatic welding arrangement for forming weld beads of this nature that the present invention is concerned.

A particular object of the present invention is the provision of a welding machine which will automatically apply an annular weld bead between two abutting substantial cylindrical bodies such as a cylinder and an end cap therefor.

Another object of this invention is the provision of a welding machine of the nature referred to which is fully automatic in operation with respect to loading and unloading and the application of the weld material.

Still a further object of this invention is the provision of an automatic welding machine of the nature referred to which is fully automatic in operation and which can readily be adjusted to meet varying circumstances such as changes in size or length of the pieces being operated.

Another particular object of this invention is the provision of an automatic welding arrangement which is relatively simple in construction and operation while being readily adaptable to varying circumstances.

The nature of the present invention will be more clearly understood and the several objects and advantages thereof will be appreciated upon reference to the following specification taken in connection with the accompanying drawings wherein:

FIGURE 4 is a vertical sectional view indicated by line 4—4 on FIGURE 2 showing one of the supporting heads of the machine more in detail.

FIGURE 6 is a somewhat diagrammatic representation of the entire control circuit of the machine.

Figure 1:
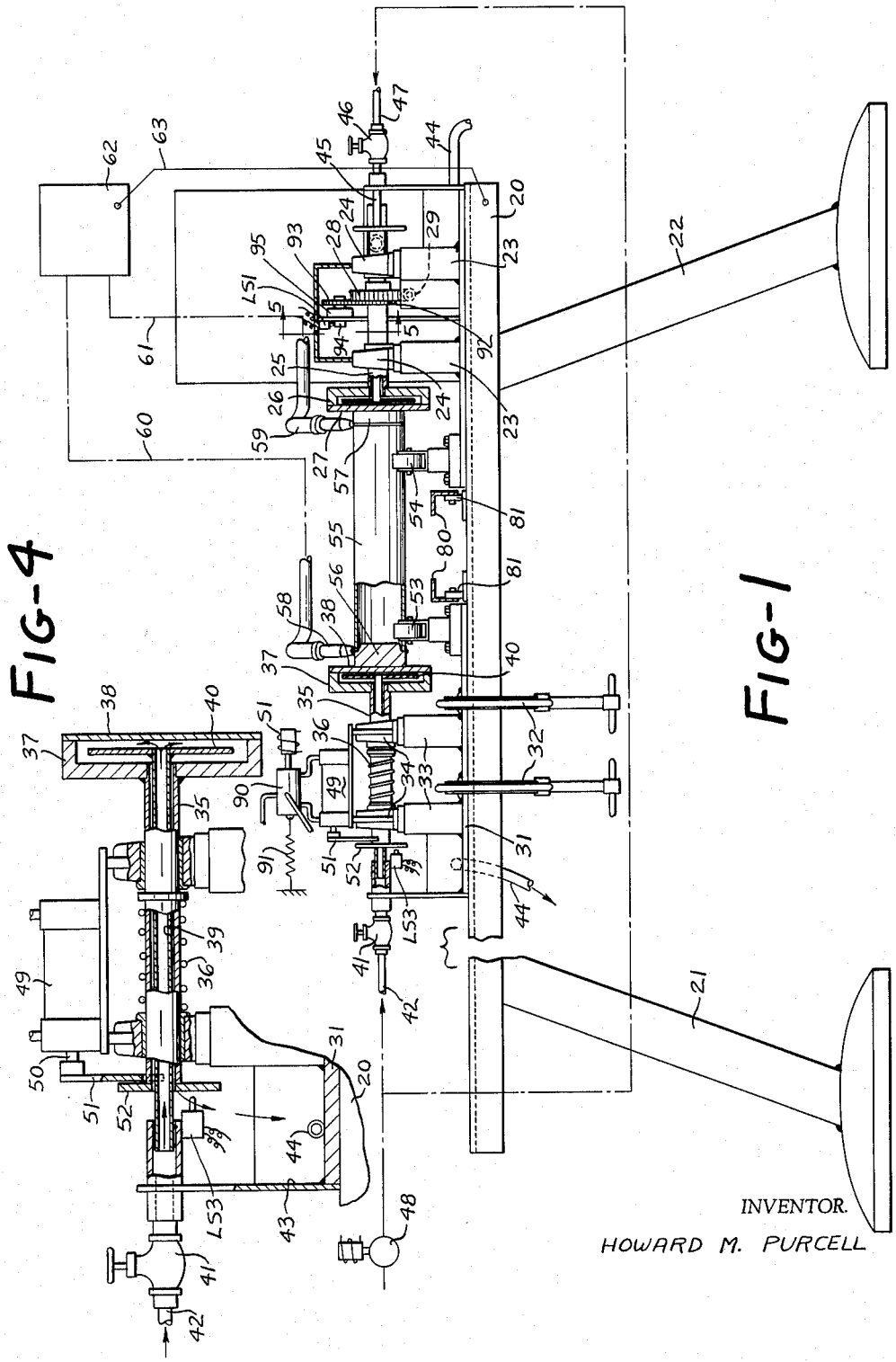
FIGURE 1 is a side view of an automatic welding machine according to the present invention partly broken away to show portions thereof in section.

Referring to the drawings somewhat more in detail, a welding machine according to the present invention comprises, generally, a pair of spaced rotating heads between which there is placed at least two generally cylindrical members and on the axis of rotation of the heads so that the members can be supported by the heads and rotated. Simultaneously with the rotating of the cylindrical members by the heads, a weld bead is applied between the members where they abut thereby fixedly securing the members together.

The machine according to the present invention includes an automatic loading mechanism and an unloading mechanism so that the entire cycle of operation can be controlled merely by initiating a cycle whereupon the weld is made and the welded work piece is automatically unloaded from the machine and new pieces to be welded are inserted therein.

In the drawings the automatic welding machine according to the present invention comprises a base portion 20 having legs 21 and 22 for supporting the base member at a convenient height. Adjacent one end of the machine are the spaced bearing supports 23 which carry bearings 24 which rotatably support a hollow shaft 25. Hollow shaft 25 terminates at its left end, as viewed in FIGURE 1, in a hollow head element 26 that is closed by a cover element 27. The head made up of parts 26 and 27 is adapted for engaging a member to be welded and for rotating the member.

Between bearings 24 hollow shaft 25 carries a worm wheel 28 and meshing with this worm wheel is a worm 29 which is driven by a geared head motor 30 at a speed greatly reduced over the motor speed. By this drive arrangement the shaft 25 can be caused to rotate slowly.

Spaced on base 20 from the bearing support members 23 is a plate 31 slidable along the bed and adapted for being clamped thereto by any suitable means, such as the C clamps 32 illustrated in FIGURE 1. This plate has bearing support members 33 fixed thereto which support bearings 34 that rotatably support another hollow shaft 35. Hollow shaft 35, however, is axially slidable in its supporting bearing and is biased rightwardly toward shaft 25 by compression spring means 36. Hollow shaft 35 terminates at its right end, as viewed in FIGURE 1, in a hollow head member 37 closed by a plate 38.

Both of the hollow heads are adapted for being internally cooled by a supply of water thereto. The manner in which this is accomplished will best be seen in FIGURE 4 which illustrates the left hand head and its supporting shaft in detail. Extending through hollow shaft 35 is a conduit 39 and fixed to the end thereof within the hollow head made up of elements 37 and 38, is a plate 40. At its left end conduit 39 is connected via a valve 41 with a water supply conduit 42, so that water can be supplied through the conduit to the inside of the hollow head.

The water so supplied to the head impinges against plate 38 and keeps it cool and then drains backwardly through hollow shaft 35 to the end thereof and then runs therefrom into a basin 43 which has a connection to drain at 44.

The head at the right hand end of the machine is similarly constructed and also has a conduit 45 extending into the hollow head and which conduit is connected by way of valve 46 with a water supply conduit 47. Conduits 47 and 42 are interconnected and lead to a source of water through a solenoid operated control valve 48.

It has been mentioned that the hollow head made up of parts 37 and 38 is spring urged toward the right hand head and it has been described that this is accomplished by spring means 36. Means are also provided for retracting the left hand head away from the right hand head thereby to release articles clamped therebetween. This is accomplished by a fluid motor consisting of a cylinder 49 and a ram 50 extending therein and which ram 50 carries a pusher element 51 that is positioned behind the plate 52 carried on the left end of hollow shaft 35. When ram 50 is thrust leftwardly it picks up plate 52 and moves the plate, together with hollow shaft 35 and the head connected thereto, leftwardly away from the right hand head.

When the ram 50 moves rightwardly, however, the hollow shaft 35 and the head carried thereby is released to the influence of spring 36 and this will move the hollow head toward the right hand head and clamp a work member therebetween.

FIGURE 1 will also show that located between the bearing support members 23 and 33 are the work piece supporting roller sets 53 and 54 on which rests the tubular part 55 which is to be connected to the end members 56 and 57 by the welding to be applied thereto by the welding heads 58 and 59, respectively.

The welding heads 58 and 59 are of the type through which a welding wire is fed. This type of welding arrangement is conventional in the art and no specific disclosure thereof is given in this application. The wires being fed to the welding heads are indicated at 60 and 61 and these are driven through the flexible tubes leading to the welding head from a welding structure 62 which may be a single welder adapted for feeding a double wire or which may be two individual welding units.

The welder has one electrode effecting electrical contact with the wires being fed to the work piece and the other electrode is connected, as by wire 63 with a suitable point on the welding machine so that a complete circuit is had for carrying out the welding operation.

Figure 2:
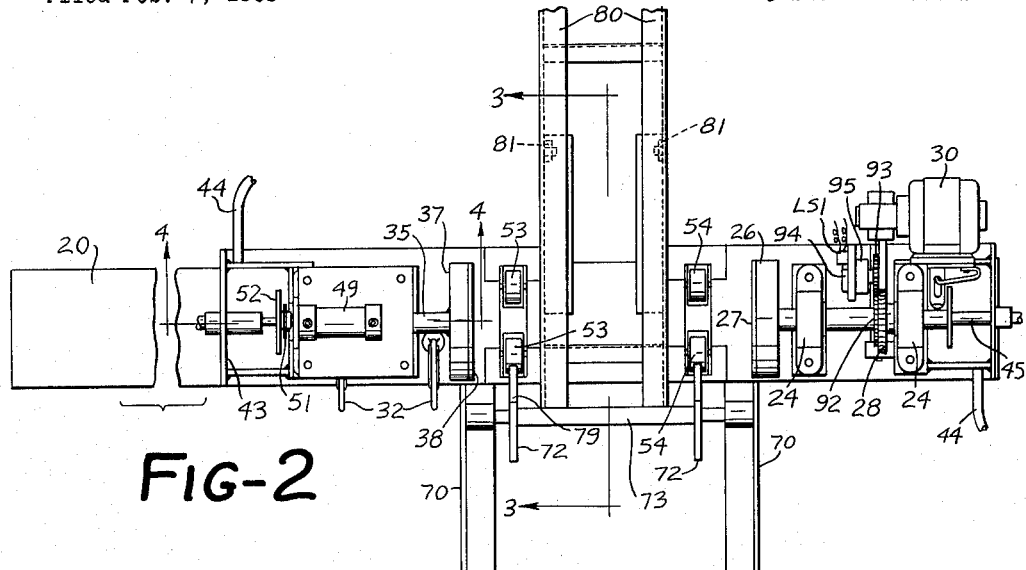
FIGURE 2 is a plan view of the machine drawn at somewhat reduced scale.

According to the present invention the work pieces to be welded are automatically loaded into the machine and are automatically removed therefrom. The loading and unloading devices will be seen in FIGURES 2 and 3. In these figures it will be noted that there is an inclined supply chute 70 leading downwardly toward the welding position in which work members 71 to be welded are loaded. The lower end of the chute is closed by one or more notched disc elements 72. These elements are mounted on a shaft 73 to which is connected arm 74 that is adapted for being actuated by a ram 75 extending into a cylinder 76. Cylinder 76 is adapted for being reversibly supplied with fluid from a reversing valve 77, spring urged by spring 78 into position to supply fluid to the upper end of cylinder 76 and operable by energization of the solenoid S3 to supply fluid to the lower end of cylinder 76 while exhausting the other end thereof.

When disc means 72 is rotated counterclockwise to bring the notch 79 thereof in front of the lowermost work piece 71, this work piece will roll into the notch and then, when the disc means is rotated clockwise, this work piece will be caused to roll out of the notch and will drop on rollers 53 and 54 and will be positioned in exact alignment with the axis of rotation of the hollow heads.

On the side of the machine opposite the loading chute is an unloading device 80 consisting of a pair of spaced rails pivoted to the machine at 81. A ram 82 is connected to the unloading rails and extends into a cylinder 83 which is adapted for being reversibly supplied with fluid by reversing valve 84. Valve 84 is normally biased by spring 85 into position to supply pressure fluid to the lower end of cylinder 83 and is adatped by energization of the solenoid S2 to supply fluid to the upper end of cylinder 83 while exhausting the lower end thereof whereby to tilt the unloading device to its dotted line position.

When the unloading device is tilted from its full line position to its dotted line position, it will lift the work member upwardly from between the hollow heads and this work member can then roll down the rails of the unloading device to a point of discharge.

It will be apparent that the control of loading and positioning and unloading of the work pieces can readily be accomplished by the mechanism described above. Adjustment of the mechanism need only take the form of replacing the discs 72 when necessary and adjustment or replacement of the rollers 53 and 54.

With respect to the valve arrangements, FIGURE 1 will show that connected to cylinder 49 is a valve 90 continuously biased by a spring 91 toward position to supply fluid to the left end of cylinder 49 and operable upon energization of the solenoid S1 to supply fluid to the right end of cylinder 49 while exhausting the left end thereof.

Also referring to FIGURE 1, it will be noted that there is carried by hollow shaft 25 a gear 92 that meshes with another gear 93 which is the same size as the gear 92. Gear 93 is connected with a cam 94 by way of an electrically operated clutch. Clutch 95 can be energized and de-energized to selectively connect and disconnect cam 94 and gear 93 for a purpose to be described hereinafter in connection with the control circuit of the machine.

Figure 5:
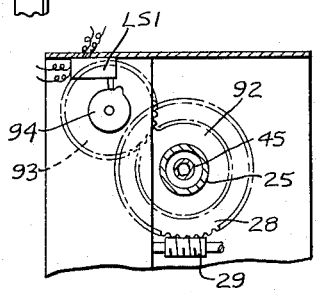
FIGURE 5 is a fragmentary sectional view indicated by line 5—5 on FIGURE 1 showing a part of the control system of the present invention.

Cam 94 is adapted for controlling a limit switch LS1. This structure will be seen more in detail in FIGURE 5 taken together with FIGURE 1.

In the operation of the machine, it will be evident that the minimum weld bead that can be placed between two cylindrical members to retain them together is a bead extending about 360° of the periphery of the members. Where it is essential for the members to be sealingly interconnected, it is desirable for the bead to extend at least slightly beyond 360° and this is the reason for the aforementioned control of the cam 94. This member, when connected to hollow shaft 25, makes exactly the same number of revolutions as shaft 25 and by employing the switch LS1 to control the stopping of the welding operation, a bead of 360° would be placed between the members. However, by unclutching cam 94 from its drive shaft, the bead can be continued beyond 360° which, as mentioned before, is essential when two parts are to be sealingly interconnected.

On account of the fact that the amount of weld material to be laid down will vary with the size of the work piece and the size of the space provided that must be filled with weld material, it follows that different speeds of operation will be had for work pieces of different size. For very large work pieces it might be necessary to rotate the work pieces quite slowly while for smaller work pieces it would be possible to rotate the work pieces more rapidly. For this reason control means are also provided to regulate the speed of rotation of the hollow heads and thereby to regulate the speed of rotation of the work piece while the welding is being carried out.

The control circuit by means of which the operation of the welder is controlled, including the loading and unloading thereof, is diagrammatically illustrated in FIGURE 6.

In FIGURE 6 the power lines are indicated at L1 and L2 and in line L1 there is a main control switch 100 which is closed to prepare the machine for operation. Connected between power lines L1 and L2 is the actuating coil 101 of a relay R1 which is in series with a stop switch 102, a manual automatic-manual selector switch 103, a manual switch 104 and a limit switch LS2. Limit switch LS2 is normally open and is positioned so that when disc means 72 are in their normal position, which is a counter-clockwise rotated position, if there is a work member 71 ready to be welded, it will be disposed in the notch means 79 and will hold limit switch LS2 closed.

Relay R1 can thus be energized only when there is a work piece ready to be supplied to the machine. Relay R1 has a holding circuit which it establishes for itself through its blade 105 and which circuit also passes through a normally closed blade 106 of another relay R3.

Relay R1 has a blade 107 thereon which, when closed, will effect energization of solenoid S1 whereby the left hand head will be retracted and released the work piece which has been operated from between the heads.

When the heads are completely open, a limit switch LS3 will be engaged by plate 52 and close, and when this limit switch closes it completes the circuit through a normally closed blade 108 of relay R2 to solenoid S2 pertaining to the unloading device. This will cause actuation of the unloading device and the now released work piece will be lifted up by the rails of the unloading device and will roll down said rails. When the work piece rolls off the rails it will engage and close a limit switch LS4 carried by the rails and when this limit switch closes a circuit is completed to the actuating coil 109 of a relay R2. This relay has a holding circuit through its blade 110 which circuit also passes through another blade 111 of the aforementioned relay R3. When relay R2 is energized it opens its blade 108 which will de-energize solenoid S2 whereupon spring 85 will return valve 84 to its original position and the unloading device will return to the position in which it is illustrated in full lines in FIGURE 3.

Closing of relay R2 also closes the blade 112 thereof and this completes the circuit to solenoid S3 pertaining to valve 77 and this will cause clockwise rotation of disc means 72 so that the work piece resting in the notch means 79 thereof will be delivered to the rollers 53, 54 on the axis of rotation of the hollow heads of the machine. When the feed disc means 72 complete their feed movement a cam portion 113 thereof will engage and close a limit switch LS5 and this will complete a circuit to the actuating coil 114 of relay R3, said circuit also extending through a normally closed blade 115 of a relay R. A holding circuit through blade 116 of relay R3 is established for the actuating coil thereof.

Energization of relay R3 will open its blade 106 thereby de-energizing relay R1 which will drop open and de-energize solenoid S1 pertaining to valve 49 thereby permitting the left hand head to be moved in by spring means 36 and to clamp the work piece resting on the work axis. De-energization of relay R3 also opens its blade 111 and this will de-energize relay R2 which will drop open and effect de-energization of solenoid S3 pertaining to valve 77 so that the feed disc means 72 will be rotated counterclockwise back to the starting position thereof.

Energization of relay R3 will also close a blade 118 pertaining thereto which is in series with a stop switch 119, a timer blade 120 and the actuating coil 121 of a relay R. De-energization of relay R3 will thus bring about energization of relay R. Relay R establishes a holding circuit for itself by way of a blade 122 thereof and upon closing will open its blade 115 to drop out relay R3 and will furthermore close its blade 123 which is in circuit with the solenoid 124 of solenoid operated valve 48. This initiates a supply of cooling water to the hollow heads.

Closing of relay R also closes blade 125 which establishes an energizing circuit for actuating coil 126 of a relay M. A selector switch 127 is in circuit with a blade 128 of relay M and, when closed, will establish a holding circuit for relay M. When switch 127 is open, relay M does not have any holding circuit.

Relay M has a blade 129 which is normally closed and which is in circuit with the actuating coil 130 of a relay MX. Relay MX is thus energized when relay M is de-energized and is de-energized when relay M is energized.

Relay MX has a blade 131 which is in series with blade 132 of relay R and also in series with the actuating coil 133 of a relay W. When relay R is energized and relay M is energized thus effecting de-energization of relay MX, relay W will be energized.

In connection with relay M it has still another blade 134 in series with variable speed reversible motor 30 previously referred to. Associated with motor 30 is a reversing switch 135 and a speed controlling rheostat 136.

Relay W has a blade 137 in circuit with the coil of clutch 95, with the said blade and coil being in series with a normally closed blade 138 of a relay OC. It will be evident that energization of relay W will thus complete the circuit through the coil of clutch 95 and this will drivingly connect a cam 94 for rotation in synchronism with the heads of the machine.

Relay W also has a blade 139 thereon in the control circuit for the welder 62 so that simultaneously with the closing of relay W the welding mechanism is also set into motion and wires are fed through the welding nozzles and the welding current is supplied thereto. The situation at this point is that motor 30 is operating thereby turning the work piece while simultaneously the welding is being accomplished.

The heads and work piece will make one complete rotation and at the end of one complete rotation cam 94 will actuate limit switch LS1 and close blade 140 thereof while simultaneously opening blade 141 thereof. Closing of blade 140 of limit switch LS1 will energize coil 142 of a relay OL which relay establishes its own holding circuit through blade 143 thereof. The closing of relay OL will open its blade 144 which is in the cathode circuit of a timer tube 145 to be described presently.

Closing of relay OL will also close its blade 145 which will complete a circuit through the actuating coil 146 of relay OC. Blades 147 and 148 of relay OL will also close, one thereof being in circuit with ammeter 149 and the other thereof being in circuit with a counter coil 150.

Energizaiton of relay OC will close its blade 151 which establishes a holding circuit for the relay and will open its blade 138 in the circuit to the coil of clutch 95. At this time, however, clutch 95 does not become de-energized because a circuit is completed therefor through blade 137 of relay W and blade 143 of relay OL. Energization of relay OC will also close its blade 152 in the cathode circuit of tube 145.

Under these conditions rotation of the work piece continues and welding continues and also cam 94 continues to turn until the blade 140 of limit switch LS1 again drops open at which time relay OL is de-energized because of the interruption in its holding circuit by the opening of blade 138 of relay OC. Opening of the circuit to the energizing coil of relay OL will permit its blades 143, 144, 145 and 147 and 148 to drop open and at this time both blade 144 of relay OL and blade 152 of relay OC in the cathode circuit of tube 145 are closed.

This initiates the time delay that will determine how much more than 360° the bead of welding will be laid down.

Tube 145 is connected in circuit in a well known manner to form a timing tube and when both blades 144 and 152 are closed, the currents commence to flow through the resisters 160 and adjustable resister 161 and after a predetermined interval of time the tube 145 becomes conductive and causes actuation of a coil T which, will open its blade 120 thereby to de-energize relay R and to interrupt the welding cycle. The welding of the work piece is now complete with an overlap at the end of the annular bead as determined by the setting of adjustable resister 161.

If the machine is to operate on a fully automatic cycle selector switch 103 is set on its lower terminal and coil T will then be operable to close a blade 163 which will automatically initiate an unloading and loading operation as previously described.

To provide for continuous operation, which is to say to provide for operation with the work piece and heads rotating continuously switch 127 can be closed to provide a holding circuit for relay M and in which case blade 164 of the said switch will open and cause illumination of the lamp 165 which will indicate that a continuous type of operation is in progress.

A double bladed selector switch at 166 is also provided which will prevent operation of the welder and which will also open the circuit through the counter 150.

Still another double bladed selector switch at 167 may be provided which will also open the circuit to the counter 150 and will open the energizing circuit to relay OC thereby preventing the timing circuit from operating.

It will be evident from the foregoing that a welding arrangement according to the present invention is well adapted for being included in an automated line and it can be made entirely automatic in operation with there being safety interlock switches to make certain that each step is carried out before the next step is initiated so that the machine cannot jam and the work pieces will move through the machine in orderly progression.

At the same time the machine can be operated entirely manually if so desired. For manually initiating a welding cycle the manual switch 168 is provided which by-passes blade 118 of relay R3. With the relatively simple control arrangement described there is thus provided a machine that can be operated either automatically or manually and which is readily adaptable to a wide class of work pieces and can accommodate work pieces of varying diameters and work pieces that require varying sizes of welding beads to be applied thereto.

With respect to the welding nozzles 58 and 59, it will be apparent that when the machine is manually operated these represent no problem but for automatic operation of the machine it will be necessary to retract these nozzles from working position in order to give the work piece clearance to be removed from the machine.

Figure 3:
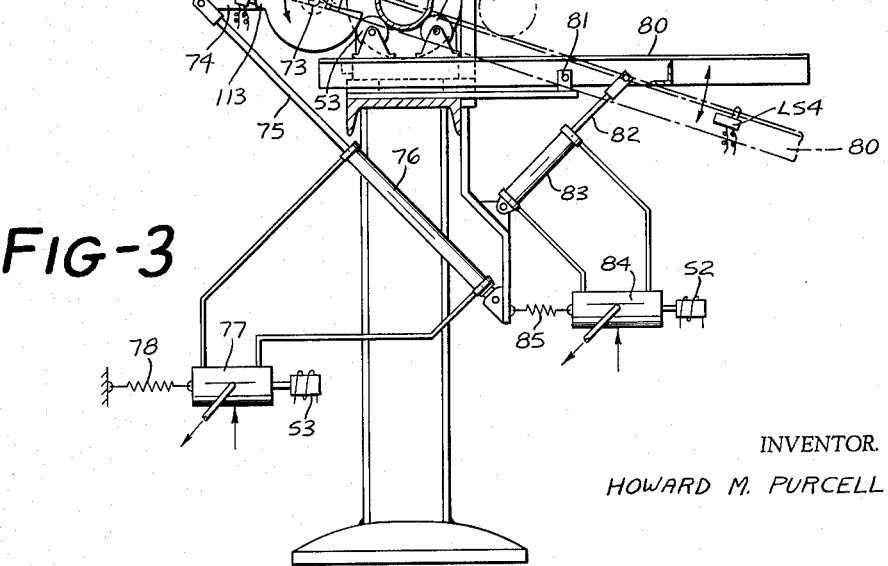
FIGURE 3 is a sectional view indicated by line 3—3 on FIGURE 2 showing more in detail the loading and unloading mechanism for the machine.

One way of doing this is illustrated in FIGURE 3 wherein it will be seen that nozzles are connected to the ram 180 which extends into a cylinder 170, said cylinder being connected with reversing valve 171 that is biased by spring 172 into position to supply fluid to the upper end of cylinder 170 while exhausting the lower end thereof whereas energization of a solenoid S4 will shift valve 171 to supply pressure fluid to the lower end of cylinder 170 while exhausting the upper end thereof.

Solenoid S4 can be connected in parallel with solenoid S2 as illustrated in FIGURE 6 so that at the initiation of an unloading operation, the welding nozzles will be retracted away from the work piece and it can then be lifted by the unloading rails and roll away from the machine. When the unloading rails return to the position in which they are illustrated in full lines in FIGURES 3, this being accomplished by de-energization of solenoid S2, solenoid S4 will also be de-energized and thus return the welding nozzles to working position. The welding nozzles are so positioned that they offer no interference to the movement of a work pice into welding position.

It will be understood that this invention is susceptible to modification in order to adapt it to different usages and conditions and accordingly, it is desired to comprehend such modifications within this invention as may fall within the scope of the appended claims.

What I claim is:

1. In a welding machine, head means operable to clampingly receive therebetween and to rotate a pair of abutting members, welding means including a nozzle adjacent the region of abutment of said members operable for welding the members together during rotation thereof, means to initiate rotation of said head means while simultaneously actuating said welding means, a control switch, a cam controlling said switch, drive means connecting said cam to said head means for driving of the cam in synchronism with the head means, said cam being arranged to actuate said switch means after one complete revolution of said head means, and control means connected to said switch means and actuated by the switch means upon actuation of the latter by said cam, said control means including means for interrupting operation of said head means and said welding means a predetermined time after the head means has completed one revolution to provide for more than 360° of welding on said members.

2. In a welding machine; spaced rotatable head means adapted for clampingly receiving therebetween abutting members to be welded together, welding means including a nozzle adjacent the region of abutment of said members operable for welding the members together, means to initiate rotation of said head means and for actuating said welding means to commence a welding operation, a switch, a cam for actuating said switch, drive means connecting the cam to the head means to drive the cam in synchronism with said head means, said cam being arranged to actuate said switch after one revolution of said head means, and control means operated by actuation of said switch and operable to interrupt operation of said head means and welding means, said control means including adjusable time delay means operable to effect said interruption after a predetermined time delay period to provide for more than 360° of welding on said members.

3. In a welding machine; spaced rotatable head means adapted for clampingly receiving therebetween abutting members to be welded together, welding means including a nozzle adjacent the region of abutment of said members operable for welding the members together, means to initiate rotation of said head means and for actuating said welding means to commence a welding operation, a switch, a cam for actuating said switch, drive means connecting the cam to the head means to drive the cam in synchronism with said head means, said cam being arranged to actuate said switch after one revolution of said head means, and control means operated by actuation of said switch and operable to interrupt operation of said head means and welding means, said control means including adjustable time delay means operable to effect said interruption after a predetermined time delay period to provide for more than 360° of welding on said members, said drive means including a clutch responsive to actuation of said switch for interrupting said drive means to halt the cam while the head means continues to rotate during said time delay period.

4. In a welding machine; spaced rotatably mounted head means, first means energizeable for moving said head means away from each other to receive therebetween work units comprising abutting members to be welded, rollers for receiving and supporting said members on the axis of rotation of said head means, second means for moving the head means toward each other to clamp the said members therebetween, variable speed drive means connected to at least one of said head means for driving the head means and the members clamped therebetween in rotation, welding means for welding the members together including wire feed nozzle means in the region of abutment of said members, cycle start means operable to energize said drive means and to actuate said welding means, cycle stop means operable in response to a predetermined amount of rotary movement of said head means to deenergize said drive means and interrupt operation of said welding means, control means operable in response to the actuation of said cycle stop means to energize said first means to unclamp the welded workpiece from said head, unloading means operated by said control means to discharge the welded workpiece from between said head, and loading means also operated by said control means following the operation of said unloading means to supply other abutting members to be welded to the space between said heads.

5. A welding machine according to claim 4, which includes; means operated by said control means following the operation of said loading means for deenergizing said first means and making said second means effective.

6. A welding machine according to claim 4 which includes; means operated by said control means following the operation of said loading means for deenergizing said first means and making said second means effective, and for automatically actuating said cycle start means.

7. A welding machine according to claim 4 in which said loading means comprises chute means in which said abutting members can be placed and which is inclined toward the axis of rotation of said head means, and a control member movably mounted at the lower end of the chute means having a first position wherein a single unit is received therein from the chute means and a second position wherein said unit is released to said rollers while other units in the chute means are blocked by said control member.

8. A welding machine according to claim 4 in which said unloading means comprises pivotally supporting rail means movable from a horiontal position beneath the work unit being welded to an inclined position wherein the welded unit between the head means is lifted from said rollers by the rail means and rolls down the rail means to discharge.

9. A welding machine according to claim 8 in which means is provided connected to said nozzle means operable for retracting the nozzle means from the unit during operation of said unloading means.

10. In a welding machine; a frame, spaced coaxial heads rotatably mounted in said frame; a first motor connected to one of said heads operable when energized to drive it in rotation, spring means urging said heads toward each other, a second motor operable when energized to retract said heads away from each other, support means between the heads to receive and support a cylindrical work unit comprising abutting members to be welded together, said support means supporting said unit coaxially with said heads, welding means operable when energized for welding said members together and including wire feed nozzle means in the region of abutment of said members, loading means operable when energized to deliver a single work unit to said support means, unloading means operable when energized to discharge a welded unit from said support means, cycle start means operable to energize said first motor and said welding means to weld a work unit clamped between said heads, cycle stop means including control means responsive to a predetermined rotation of said heads and the work unit clamped thereby for deenergizing said welding means and said first motor and for energizing said second motor, means responsive to movement of said other head away from said one head for energizing said unloading means, means responsive to the discharge of a welded unit by said unloading means for denergizing said unloading means and for energizing said loading means, and means responsive to completion of the loading movement of said loading means to deenergize said second motor and said loading means and to again actuate said cycle start means.

11. A welding machine according to claim 10 in which auxiliary control means is provided operable to prevent the said energization of said loading means if a work unit to be delivered to working position thereby is absent.

12. A welding machine according to claim 11 in which said unit is a cylinder and heads at opposite ends thereof and said nozzle means comprises two nozzles, one said nozzle being located at the region of abutment of each head with the cylinder, and means is provided for passing cooling water through the heads.

References Cited by the Examiner
UNITED STATES PATENTS

| | | | |
|---|---|---|---|
| 2,251,324 | 8/1941 | Carlson | 219—124 |
| 2,349,865 | 5/1944 | Hawk et al. | 219—159 X |
| 2,479,197 | 8/1949 | Anderson | 219—159 |
| 2,753,826 | 7/1956 | Dougherty | 219—159 X |
| 3,014,121 | 12/1961 | Thomas | 219—159 |

ANTHONY BARTIS, *Acting Primary Examiner.*

J. V. TRUHE, *Assistant Examiner.*